US008723852B2

(12) United States Patent
Zhan et al.

(10) Patent No.: US 8,723,852 B2
(45) Date of Patent: May 13, 2014

(54) METHOD OF DRIVING A DISPLAY PANEL, AND DISPLAY DEVICE FOR PERFORMING THE METHOD

(75) Inventors: Zhi-Feng Zhan, Yongin (KR); Seung-Gyu Tae, Yongin (KR); Sung-Hoon Moon, Yongin (KR); Deok-Hoi Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 386 days.

(21) Appl. No.: 13/115,812

(22) Filed: May 25, 2011

(65) Prior Publication Data

US 2012/0105407 A1 May 3, 2012

(30) Foreign Application Priority Data

Oct. 29, 2010 (KR) ........................ 10-2010-0106429

(51) Int. Cl.
*G06F 3/038* (2013.01)

(52) U.S. Cl.
USPC .......................................................... 345/209

(58) Field of Classification Search
None
See application file for complete search history.

(56) References Cited

U.S. PATENT DOCUMENTS 7,030,843 B2 * 4/2006 Youn ................................ 345/86
7,671,830 B2 * 3/2010 Kamio ............................. 345/96
2005/0104835 A1 * 5/2005 Misonou et al. ................ 345/96
2009/0289928 A1 * 11/2009 Shi ................................ 345/209

* cited by examiner

*Primary Examiner* — Adam R Giesy
(74) *Attorney, Agent, or Firm* — Christie, Parker & Hale, LLP

(57) ABSTRACT

A method of driving a display panel includes sequentially applying a gate signal to a plurality of gate lines of the display panel during each frame period of a plurality of frame periods, applying data voltages to a plurality of data lines of the display panel, and applying a common voltage to the display panel, a polarity of the common voltage being inverted periodically and asynchronously with a frame period of the frame periods.

20 Claims, 18 Drawing Sheets

10

FRAME K

FRAME K+1

FIG. 7C

FRAME K+2

| | | | | | | | |
|---|---|---|---|---|---|---|---|
| + | + | + | + | + | + | + | + |
| + | + | + | + | + | + | + | + |
| + | + | + | + | + | + | + | + |
| + | + | + | + | + | + | + | + |
| + | + | + | + | + | + | + | + |
| + | + | + | + | + | + | + | + |
| + | + | + | + | + | + | + | + |
| + | + | + | + | + | + | + | + |

FIG. 7D

FRAME K+3

| | | | | | | | |
|---|---|---|---|---|---|---|---|
| − | − | − | − | − | − | − | − |
| − | − | − | − | − | − | − | − |
| − | − | − | − | − | − | − | − |
| − | − | − | − | − | − | − | − |
| − | − | − | − | − | − | − | − |
| − | − | − | − | − | − | − | − |
| − | − | − | − | − | − | − | − |
| − | − | − | − | − | − | − | − |

FIG. 9A

FRAME K

| | | | | | | | |
|---|---|---|---|---|---|---|---|
| + | + | + | + | + | + | + | + |
| + | + | + | + | + | + | + | + |
| + | + | + | + | + | + | + | + |
| + | + | + | + | + | + | + | + |
| + | + | + | + | + | + | + | + |
| + | + | + | + | + | + | + | + |
| + | + | + | + | + | + | + | + |
| + | + | + | + | + | + | + | + |

FRAME K+1

| | | | | | | | |
|---|---|---|---|---|---|---|---|
| − | − | − | − | − | − | − | − |
| − | − | − | − | − | − | − | − |
| − | − | − | − | − | − | − | − |
| − | − | − | − | − | − | − | − |
| − | − | − | − | − | − | − | − |
| − | − | − | − | − | − | − | − |
| − | − | − | − | − | − | − | − |
| + | + | + | + | + | + | + | + |

FRAME K+2

FRAME K+3

FRAME K

FRAME K+1

FIG. 12C

FRAME K+2

| | | | | | | | |
|---|---|---|---|---|---|---|---|
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |

FIG. 12D

FRAME K+3

| | | | | | | | |
|---|---|---|---|---|---|---|---|
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |

FIG. 14A

FRAME K

| | | | | | | | |
|---|---|---|---|---|---|---|---|
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |

FIG. 14B

FRAME K+1

| | | | | | | | |
|---|---|---|---|---|---|---|---|
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |
| + | + | + | + | + | + | + | + |
| − | − | − | − | − | − | − | − |

FIG. 14C

FRAME K+2

| | | | | | | | |
|---|---|---|---|---|---|---|---|
| + | + | + | + | + | + | + | + |
| − | − | − | − | − | − | − | − |
| + | + | + | + | + | + | + | + |
| − | − | − | − | − | − | − | − |
| − | − | − | − | − | − | − | − |
| + | + | + | + | + | + | + | + |
| − | − | − | − | − | − | − | − |
| + | + | + | + | + | + | + | + |

FIG. 14D

FRAME K+3

| | | | | | | | |
|---|---|---|---|---|---|---|---|
| − | − | − | − | − | − | − | − |
| + | + | + | + | + | + | + | + |
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |

METHOD OF DRIVING A DISPLAY PANEL, AND DISPLAY DEVICE FOR PERFORMING THE METHOD

CROSS-REFERENCE TO RELATED APPLICATION

This application claims priority under 35 U.S.C. §119 to Korean patent Application No. 10-2010-0106429 filed on Oct. 29, 2010, the disclosure of which is incorporated by reference herein in its entirety.

BACKGROUND

1. Field

Embodiments of the present invention relate to a display device. More particularly, example embodiments of the present invention relate to a method of driving a display panel and a display device for performing the method.

2. Description of Related Art

Generally, a liquid crystal display (LCD) device includes a display panel having a plurality of pixels that includes a liquid crystal layer having a dielectric anisotropic material between a pixel electrode and a common electrode and a driving unit that drives the display panel. The LCD device may display an image by controlling light transmittance of the liquid crystal layer based on an intensity of an electric field formed between the pixel electrode and the common electrode.

The liquid crystal layer may deteriorate due to polarization if a voltage of the same polarity is continuously applied to the liquid crystal layer. In order to reduce or prevent the deterioration of the liquid crystal layer, the LCD device may periodically invert a polarity of the electric field formed between the pixel electrode and the common electrode. Conventional inversion methods include a frame inversion method, a line inversion method, a dot inversion method, etc.

In the conventional inversion methods, an effective voltage provided to pixels in a lower region of the display panel may be smaller than an effective voltage provided to pixels in an upper region of the display panel according to the manner in which a common voltage is applied to invert a polarity of the electric field formed between the pixel electrode and the common electrode. Hence, in the display panel, the brightness of the lower region may be lower than the brightness of the upper region.

SUMMARY

Embodiments of the present invention provide a method of driving a display panel, capable of reducing or preventing brightness differences in the display panel.

Other embodiments of the present invention provide a display device, capable of performing the method of driving a display panel.

According to one aspect of embodiments of the present invention, a method of driving a display panel includes sequentially applying a gate signal to a plurality of gate lines of the display panel during each frame period of a plurality of frame periods, applying data voltages to a plurality of data lines of the display panel, and applying a common voltage to the display panel, a polarity of the common voltage being inverted periodically and asynchronously with a frame period of the frame periods.

A gate line of the gate lines to which the gate signal is applied when the polarity of the common voltage is inverted during a frame may be different from a gate line of the gate lines to which the gate signal is applied when the polarity of the common voltage is inverted during an adjacent frame.

Each gate line to which the gate signal is applied when the polarity of the common voltage is inverted during each of R frames may be the same as each gate line to which the gate signal is applied when the polarity of the common voltage is inverted during corresponding ones of each of next R frames.

An average elapsed time in which the gate signal is applied to each gate line after the polarity of the common voltage is inverted may be substantially equal with respect to each of the gate lines.

A length of a polarity inversion period of the common voltage may be smaller than a length of the frame period, and may be greater than half of the length of the frame period.

A length of a polarity inversion period of the common voltage may be smaller than 1.5 times a length of the frame period, and may be greater than a length of the frame period.

A length of a polarity inversion period of the common voltage may be smaller than a length of a period of a vertical synchronization signal, and may be greater than half of the length of the period of the vertical synchronization signal, frame period corresponding to the vertical synchronization signal.

A length of a polarity inversion period of the common voltage may be smaller than 1.5 times a length of a period of a vertical synchronization signal, and may be greater than a length of the period of the vertical synchronization signal, the frame period corresponding to the vertical synchronization signal.

The common voltage may be applied to all pixels of the display panel.

A length of a polarity inversion period of the common voltage may be smaller than the frame period by an integer multiple of a length of a reference period, and may be greater than half of a length of the frame period, the gate signal may be applied to one of the gate lines for a period corresponding to the length of the reference period.

A length of a polarity inversion period of the common voltage may be smaller than 1.5 times a length of the frame period, and may be greater than the length of the frame period by an integer multiple of a length of a reference period, the gate signal being applied to one of the gate lines for a period corresponding to the length of the reference period.

A length of a polarity inversion period of the common voltage may be smaller than a length of a period of a vertical synchronization signal by an integer multiple of a length of a reference period, and may be greater than half of the length of the period of the vertical synchronization signal, the gate signal being applied to one of the gate lines for a period corresponding to the length of the reference period, and the frame period corresponding to the vertical synchronization signal.

A length of a polarity inversion period of the common voltage may be smaller than 1.5 times a length of a period of a vertical synchronization signal, and may be greater than the period of the vertical synchronization signal by an integer multiple of a length of a reference period, the gate signal being applied to one of the gate lines for a period corresponding to the length of the reference period, the frame period corresponding to the vertical synchronization signal.

The common voltage may include a first common voltage applied to pixels coupled to first gate lines, and a second common voltage applied to pixels coupled to second gate lines, the first gate lines and the second gate lines being alternately arranged, wherein a length of a polarity inversion period of the first common voltage may be substantially the same as a length of a polarity inversion period of the second common voltage, wherein a polarity of the first common voltage and a polarity of the second common voltage may be inverted at different times separated by an interval of a reference period, the gate signal being applied based on the reference period, wherein the polarity of the first common voltage may be opposite to the polarity of the second common voltage.

The length of the polarity inversion period of the first common voltage and the length of the polarity inversion period of the second common voltage may be smaller than a length of the frame period by an integer multiple of the reference period, and may be greater than half of the length of the frame period.

The length of the polarity inversion period of the first common voltage and the length of the polarity inversion period of the second common voltage may be smaller than 1.5 times the length of the frame period, and may be greater than a length of the frame period by an integer multiple of the reference period.

The length of the polarity inversion period of the first common voltage and the length of the polarity inversion period of the second common voltage may be smaller than a length of a period of a vertical synchronization signal by an integer multiple of the reference period, and may be greater than half of the length of the period of the vertical synchronization signal, the frame period corresponding to the vertical synchronization signal.

The length of the polarity inversion period of the first common voltage and the length of the polarity inversion period of the second common voltage may be smaller than 1.5 times a length of a period of a vertical synchronization signal, and may be greater than a length of a period of a vertical synchronization signal by an integer multiple of the reference period, the frame period corresponding to the vertical synchronization signal.

According to another aspect of example embodiments, a display device may include a display panel having a plurality of pixels coupled to a plurality of gate lines and a plurality of data lines, and a driving unit that sequentially applies a gate signal to the gate lines during each frame period of a plurality of frame periods, that applies data voltages to the data lines, and that applies a common voltage into the pixels, a polarity of the common voltage may be inverted periodically and asynchronously with respect to a frame period of the frame periods.

In example embodiments, an average elapsed time in which the gate signal is applied to each gate line after the polarity of the common voltage is inverted may be substantially equal to each of the gate lines.

According to example embodiments, a method of driving a display panel may reduce or prevent brightness differences between an upper region and a lower region of the display panel based on a common voltage of which a polarity is inverted periodically and asynchronously with a frame period. Namely, polarity inversion timings of the common voltage may be substantially uniformly distributed through one frame period. In addition, a display device may provide a high quality image by reducing or preventing brightness differences between an upper region and a lower region of its display panel.

BRIEF DESCRIPTION OF THE DRAWINGS

Example embodiments can be understood in more detail from the following description taken in conjunction with the accompanying drawings, in which:

FIGS. 7A, 7B, 7C, and 7D are diagrams illustrating a polarity of a common voltage that is changed by the frame inversion method of FIG. 6.

FIGS. 9A, 9B, 9C, and 9D are diagrams illustrating a polarity of a common voltage that is changed by a method of the embodiment shown in FIG. 8.

FIGS. 12A, 12B, 12C, and 12D are diagrams illustrating a polarity of a common voltage that is changed by the method of the timing diagram of FIG. 11.

FIGS. 14A, 14B, 14C, and 14D are diagrams illustrating a polarity of a common voltage that is changed by a method of the embodiment shown in FIG. 13.

DETAILED DESCRIPTION

Figure 1:
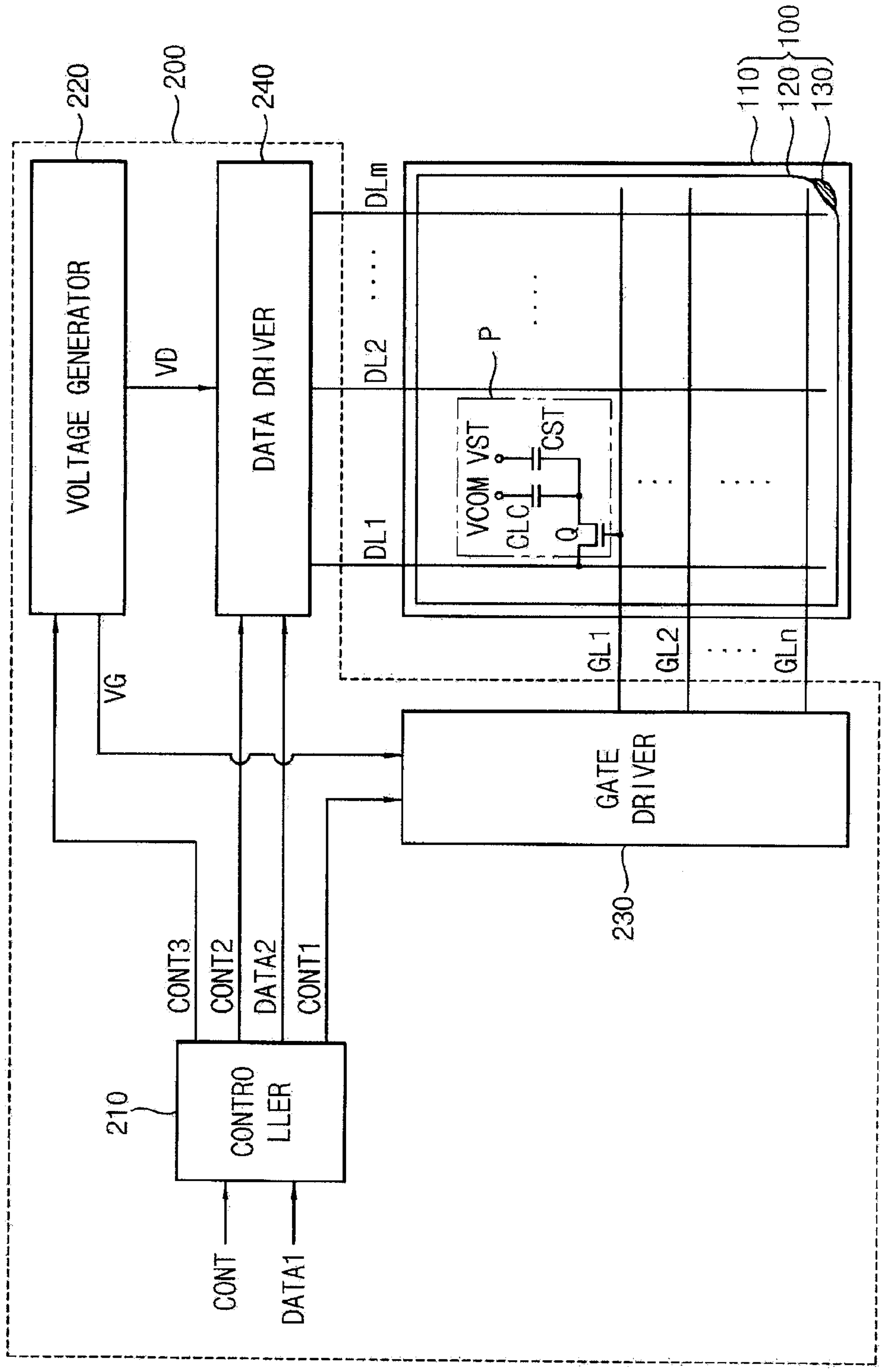
FIG. 1 is a block diagram illustrating a display device in accordance with example embodiments.

Embodiments of the present invention will be described in more detail hereinafter with reference to the accompanying drawings. The present invention may, however, be embodied in many different forms and should not be construed as being limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the present invention. As such, variations from the shapes of the illustrations as a result, for example, of manufacturing techniques and/or tolerances, are to be expected. Thus, example embodiments should not be construed as being limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
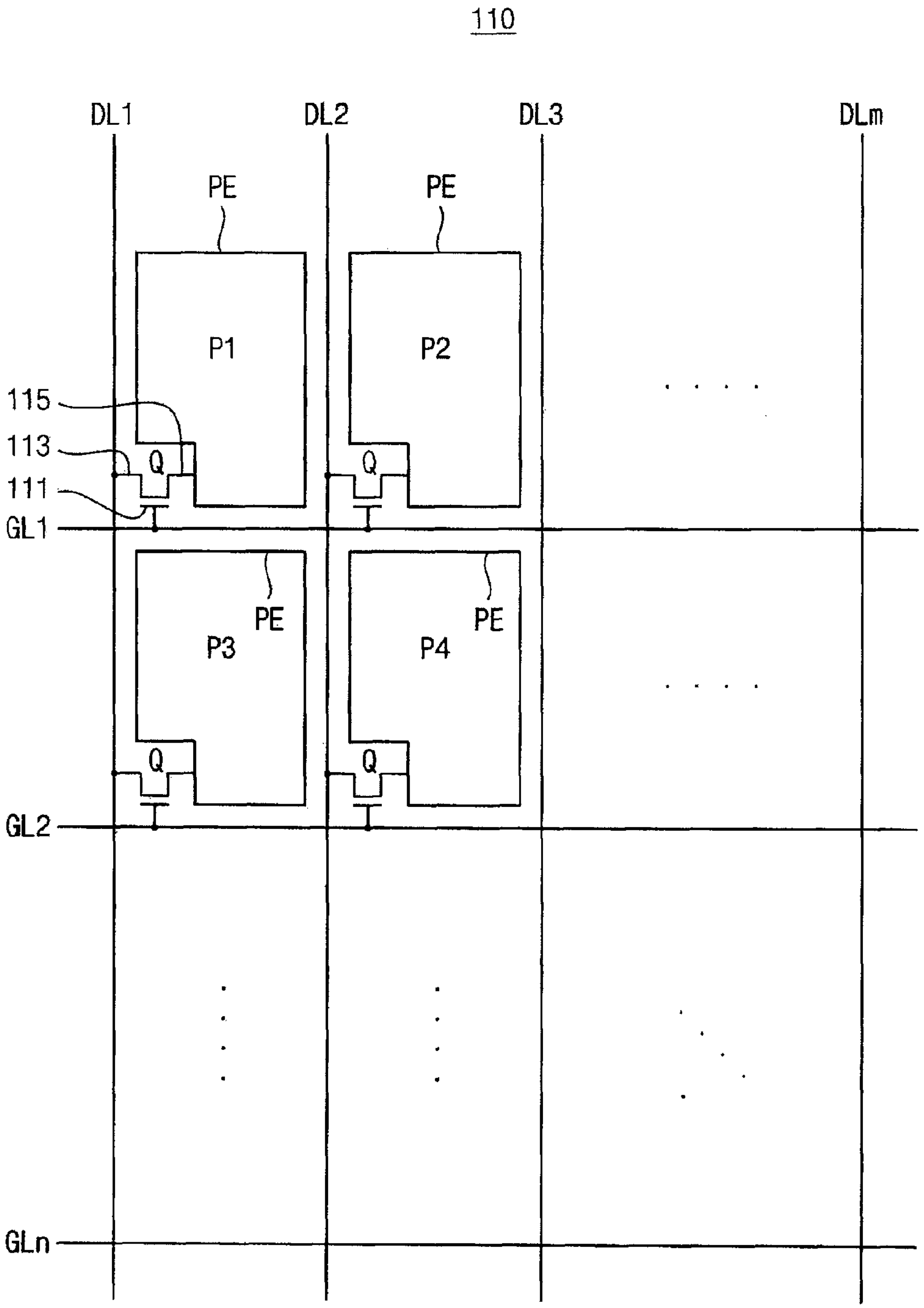
FIG. 2 is a diagram illustrating a lower substrate of a display panel in a display device of FIG. 1 according to one embodiment of the present invention.
Figure 3:
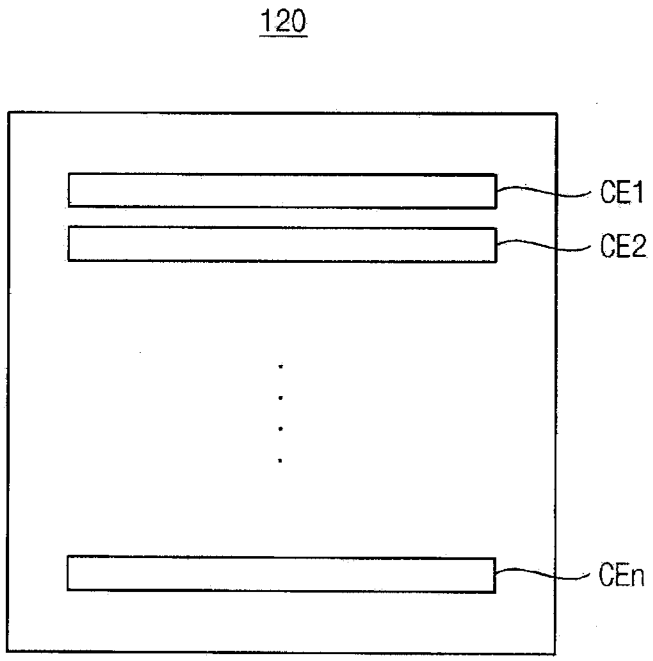
FIG. 3 is a diagram illustrating an upper substrate of a display panel in a display device of FIG. 1 according to one embodiment of the present invention.

FIG. 1 is a block diagram illustrating a display device in accordance with embodiments of the present invention. FIG. 2 is a diagram illustrating a lower substrate of a display panel in a display device of FIG. 1 according to one embodiment of the present invention. FIG. 3 is a diagram illustrating an upper substrate of a display panel in a display device of FIG. 1.

Referring to FIG. 1, according to one embodiment of the present invention, the display device 10 includes a display panel 100 and a driving unit 200. The driving unit 200 drives the display panel 100.

According to the embodiment shown in FIG. 1, the display panel 100 includes a plurality of gate lines GL1 through GLn, a plurality of data lines DL1 through DLm, and a plurality of pixels P. The gate lines (or scan lines) GL1 through GLn are arranged in a first direction. The data lines DL1 through DLm are arranged in a second direction. Here, the first direction may be different from the second direction. For example, the first direction may be perpendicular to the second direction. The pixels P are arranged in a matrix manner, and are coupled to the gate lines GL1 through GLn and the data lines DL1 through DLm. Each of the pixels P includes a switching element Q, a liquid crystal capacitor CLC, and a storage capacitor CST. The switching element Q is coupled to one of the gate lines GL1 through GLn and one of the data lines DL1 through DLm.

The display panel 100 includes a lower substrate 110, an upper substrate 120, and a liquid crystal layer 130 as well as the gate lines GL1 through GLn and the data lines DL1 through DLm. The lower substrate 110 includes a plurality of switching elements Q and a plurality of pixel electrodes. The upper substrate 120 includes a plurality of common electrodes. The liquid crystal layer 130 is located between the lower substrate 110 and the upper substrate 120.

Referring to FIG. 2, according to one embodiment of the present invention, the lower substrate 110 includes a plurality of pixels P1, P2, P3, and P4 arranged at locations corresponding to crossing regions of the gate lines GL1 through GLn and the data lines DL1 through DLm. Each of the pixels P1, P2, P3, and P4 includes a switching element Q and a pixel electrode PE. The switching element Q may be a thin film transistor (TFT) that includes a gate electrode 111, a source electrode 113, and a drain electrode 115. The gate electrode 111 is coupled to one of the gate lines GL1 through GLn. The source electrode 113 is coupled to one of the data lines DL1 through DLm. The drain electrode 115 is coupled to the pixel electrode PE and may be coupled to a storage capacitor CST.

Referring to FIG. 3, according to one embodiment of the present invention, the upper substrate 120 includes a plurality of common electrodes CE1 through CEn. The common electrodes CE1 through CEn may be opposite to the pixel electrodes PE of the lower substrate 110. The common electrodes CE1 through CEn that are spaced apart from each other may run parallel with the gate lines GL1 through GLn. For example, the first common electrode CE1 may be opposite to the pixel electrodes PE arranged to extend in the same direction in which the first gate line GL1 extends.

The liquid crystal capacitor CLC may include a first electrode, a second electrode, and a liquid crystal layer. The first electrode may correspond to the pixel electrode PE that is formed on the lower substrate 110. The second electrode may correspond to the common electrode CE that is formed on the upper substrate 120. The liquid crystal layer may correspond to a dielectric anisotropic material that is placed between the first electrode and the second electrode. Thus, the liquid crystal capacitor CLC may have a specific capacitance. In addition, the storage capacitor CST may maintain a charged voltage of the liquid crystal capacitor CLC.

Referring back to FIG. 1, the driving unit 200 may include a controller 210, a voltage generator 220, a gate driver 230, and a data driver 240.

According to one embodiment of the present invention, the controller 210 may receive an input control signal CONT and an input video signal DATA1 from an image source (e.g., an external graphic device). The input control signal CONT may include a main clock signal, a vertical synchronization signal, a horizontal synchronization signal, and a data enable signal. The controller 210 may generate a data signal DATA2 based on the input video signal DATA1 to provide the data signal DATA2 to the data driver 240. Here, the data signal DATA2 may be a digital signal for operations of the display panel 100. In addition, the controller 210 may generate a first control signal CONT1, a second control signal CONT2, and a third control signal CONT3 to provide the first control signal CONT1, the second control signal CONT2, and the third control signal CONT3 to the gate driver 230, the data driver 240, and the voltage generator 220, respectively. The first control signal CONT1 may be generated based on the input control signal CONT to control driving timings of the gate driver 230. The second control signal CONT2 may be generated based on the input control signal CONT to control driving timings of the data driver 240. The third control signal CONT3 may be generated based on the input control signal CONT to control the voltage generator 220.

The voltage generator 220 may receive an external power, may generate a gate driving voltage VG based on the external power to provide the gate driving voltage VG to the gate driver 230, and may generate a data driving voltage VD based on the external power to provide the data driving voltage VD to the data driver 240. The gate driving voltage VG is supplied to the gate driver 230. The data driving voltage VD is supplied to the data driver 240. In addition, the voltage generator 220 may generate a storage voltage VST to provide the storage voltage VST to the storage capacitor CST of the display panel 100. Further, the voltage generator 220 may generate a common voltage VCOM to provide the common voltage VCOM to the common electrode CE that is formed on the upper substrate 120 of the display panel 100. Here, a period of the common voltage VCOM may be different from a period of the vertical synchronization signal. In other words, a polarity of the common voltage VCOM may be inverted periodically and asynchronously with the vertical synchronization signal. Because the data signal DATA2 for one frame is displayed on the display panel 100 during one period of the vertical synchronization signal, a plurality of frames may be distinguished (or separated) from each other based on the vertical synchronization signal.

The gate driver 230 may sequentially apply a gate signal to the gate lines GL1 through GLn during each frame based on the first control signal CONT1 output from the controller 210 and the gate driving voltage VG output from the voltage generator 220.

The data driver 240 may convert the data signal DATA2 output from the controller 210 into data voltages based on the second control signal CONT2 output from the controller 210 and the data driving voltage VD output from the voltage generator 220. Here, the data voltages may be analog signals. Then, the data driver 240 may apply data voltages to the data lines DL1 through DLm.

Hereinafter, operations of the display panel 100 according to one embodiment of the present invention will be described in additional detail.

When the gate signal is applied into one of the gate lines GL1 through GLn, and the data voltages are applied to the data lines DL1 through DLm, the switching elements Q in the pixels P coupled to the one of the gate lines GL1 through GLn may turn on. Thus, the data voltages may be applied to the pixel electrodes PE of the pixels P coupled to the one of the gate lines GL1 through GLn. Meanwhile, the common voltage VCOM may be applied to the common electrode CE. Thus, the liquid crystal capacitor CLC is charged so that an electric field is formed between the common electrode CE and the pixel electrode PE. Because a molecular arrangement of the liquid crystal layer 130 is changed by the electric field that is formed between the common electrode CE and the pixel electrode PE, light transmittance of the liquid crystal layer 130 may be changed.

The liquid crystal layer 130 may deteriorate due to polarization if a voltage of the same polarity is continuously applied into the liquid crystal layer 130. In order to reduce or prevent deterioration of the liquid crystal layer 130, the voltage generator 220 may generate and apply the common voltage VCOM having a polarity which is periodically inverted to the common electrode CE. Hence, a polarity of the electric field that is formed between the common electrode CE and the pixel electrode PE may be periodically inverted.

Figure 4:
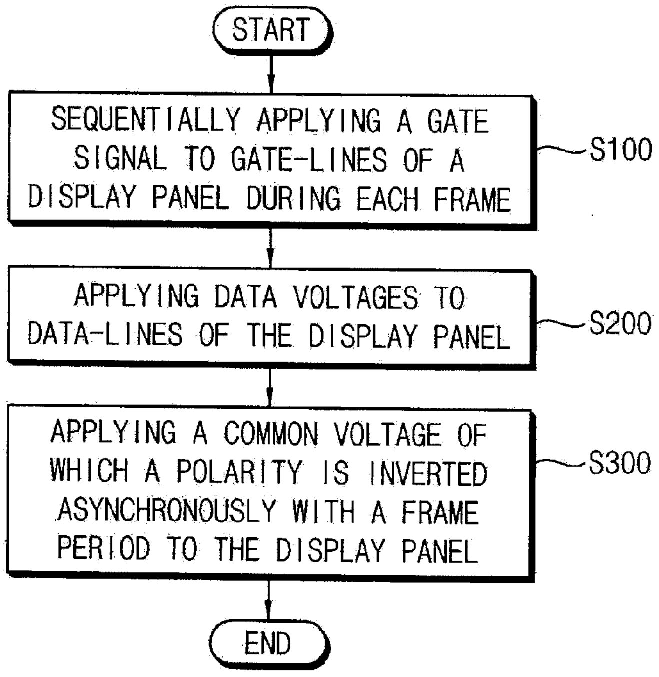
FIG. 4 is a flowchart illustrating a method of driving a display panel in accordance with one embodiment of the present invention.

FIG. 4 is a flow chart illustrating a method of driving a display panel in accordance with an embodiment of the present invention.

Referring to FIG. 4, the gate driver 230 sequentially applies the gate signal to the gate lines GL1 through GLn of the display panel 100 based on the first control signal CONT1 and the gate driving voltage VG during each frame (S100). As described above, the gate driver 230 receives the first control signal CONT1 from the controller 210, and receives the gate driving voltage VG from the voltage generator 220. The data driver 240 converts the data signal DATA2 into the data voltages based on the second control signal CONT2 and the data driving voltage VD, and applies the data voltages into the data lines DL1 through DLm (S200). As described above, the data driver 240 receives the second control signal CONT2 from the controller 210, receives the data driving voltage VD from the voltage generator 220, and receives the data signal DATA2 from the controller 210. The voltage generator 220 applies the common voltage VCOM into the common electrode CE formed on the upper substrate 120 of the display panel 100 (S300). As described above, a polarity of the common voltage VCOM is inverted periodically and asynchronously with a frame period.

In the embodiment shown in FIG. 4, S100, S200, and S300 are illustrated as being sequentially performed. However, the order is not limited thereto. For example, S100, S200, and S300 may be concurrently performed, or may be performed in an order different from the order illustrated in FIG. 4.

The frame period may be determined based on the vertical synchronization signal that the controller 210 receives from outside. Generally, during one period of the vertical synchronization signal, an image of one frame may be displayed on the display panel 100 by sequentially selecting each of the gate lines GL1 through GLn, and by applying the data voltages into the data lines DL1 through DLm. Here, a polarity inversion period of the common voltage VCOM applied into the display panel 100 may be different from a period of the vertical synchronization signal. Hence, a polarity of the common voltage VCOM may be periodically inverted asynchronously with respect to the vertical synchronization signal.

Since a polarity inversion period of the common voltage VCOM is different from a frame period, a polarity inversion timing of the common voltage VCOM during a frame may be different from a polarity inversion timing of the common voltage VCOM during an adjacent frame. In other words, a gate line that the gate signal is applied into when a polarity of the common voltage VCOM is inverted during a frame may be different from a gate line that the gate signal is applied into when a polarity of the common voltage VCOM is inverted during an adjacent frame. In addition, assuming that a number R (where R is a positive integer greater than 2) is the least common multiple of a frame period and a polarity inversion period of the common voltage VCOM, polarity inversion timings of the common voltage VCOM during current R frames may be substantially the same as polarity inversion timings of the common voltage VCOM during next R frames. In other words, each gate line that the gate signal is applied to when a polarity of the common voltage VCOM is inverted during each of current R frames may be substantially the same as each gate line that the gate signal is applied to when a polarity of the common voltage VCOM is inverted during each of next R frames. Hence, polarity inversion timings of the common voltage VCOM may be uniformly distributed through one frame period. As a result, an average elapsed time in which the liquid crystal capacitor CLC is recharged by applying the gate signal to each gate line after a polarity of the common voltage VCOM is inverted may be substantially equal with respect to each of the gate lines GL1 through GLn.

Here, if a polarity inversion period of the common voltage VCOM is smaller than half of a frame period, power consumption may be increased. On the other hand, if a polarity inversion period of the common voltage VCOM is greater than 1.5 multiple of a frame period, it is difficult to prevent deterioration of the liquid crystal layer. Thus, a polarity inversion period of the common voltage VCOM may be greater than half of a frame period, and may be smaller than a frame period (e.g., less than a full frame period). Alternatively, a polarity inversion period of the common voltage VCOM may be greater than a frame period (e.g., greater than a full frame period), and may be smaller than 1.5 multiple of a frame period (e.g., smaller than 1.5 times the length of a frame period). As described above, a frame period may be determined based on the vertical synchronization signal. In this case, a polarity inversion period of the common voltage VCOM may be greater than half of a period of the vertical synchronization signal, and may be smaller than a period of the vertical synchronization signal. Alternatively, a polarity inversion period of the common voltage VCOM may be greater than a period of the vertical synchronization signal, and may be smaller than 1.5 multiple of (e.g., 1.5 times the length of) a period of the vertical synchronization signal.

In a conventional method of driving a display panel, a frame inversion technique, or a line inversion technique may be employed. In this case (e.g., in a frame inversion technique), a polarity inversion operation may be performed based on a common voltage of which a polarity is periodically inverted in synchronization with a frame period. That is, a polarity of the common voltage may be inverted at a start timing of a current frame, and the common voltage may be maintained during the current frame. Then, a polarity of the common voltage may be inverted at a start timing of a next frame. As a result, an average elapsed time in which the liquid crystal capacitor CLC is recharged by applying the gate signal into each gate line after a polarity of the common voltage is inverted may be different with respect to each of the gate lines. For example, an average lapsed time with respect to gate lines arranged in an upper region of a display panel may be relatively short, and an average elapsed time with respect to gate lines arranged in a lower region of the display panel may be relatively long. Hence, in the display panel, brightness differences between the lower region and the upper region may be caused.

However, since the method of FIG. 4 performs a polarity inversion operation based on the common voltage VCOM of which a polarity is periodically inverted asynchronously with respect to a frame period, an average elapsed time may be substantially equal with respect to each of the gate lines GL1 through GLn. Therefore, the method of FIG. 4 may reduce or prevent brightness differences between the lower region and the upper region in the display panel 100.

Figure 5:
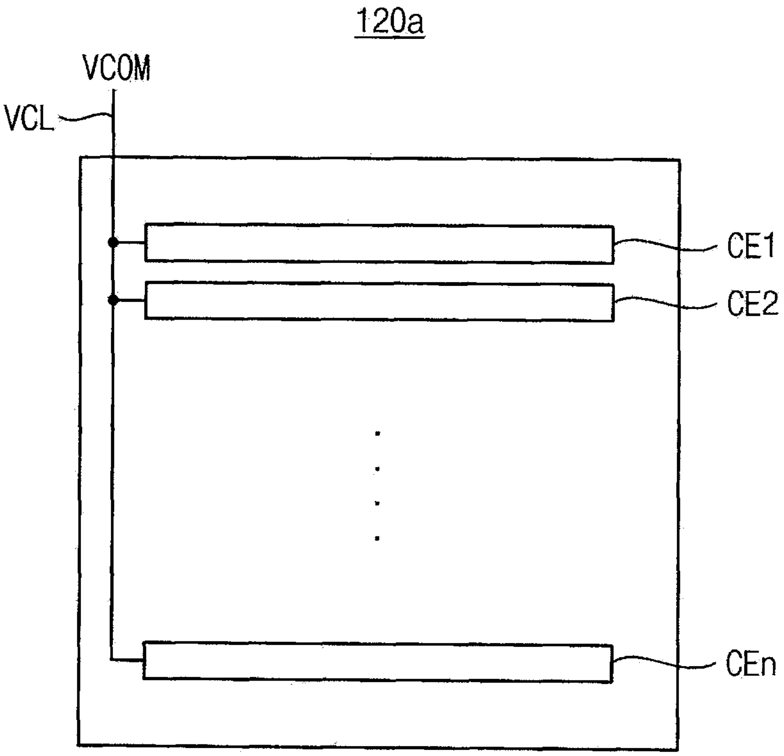
FIG. 5 is a diagram illustrating an upper substrate of a display panel in a display device of FIG. 1 according to one embodiment of the present invention.

FIG. 5 is a diagram illustrating an upper substrate of a display panel in a display device of FIG. 1 according to one embodiment of the present invention.

Referring to FIG. 5, the upper substrate 120A includes a common voltage line VCL and a plurality of common electrodes CE1 through CEn. The common electrodes CE1 through CEn may be opposite to the pixel electrodes PE that are formed on the lower substrate 110. The common electrodes CE1 through CEn are coupled to the common voltage line VCL.

The voltage generator 220 may generate the common voltage VCOM to apply the common voltage VCOM to the common voltage line VCL. Hence, all pixels P in the display panel 100 may receive the common voltage VCOM. In embodiments in which the display panel 100 includes the upper substrate 120A as illustrated in FIG. 5, the display panel 100 may employ a frame inversion technique.

Figure 6:
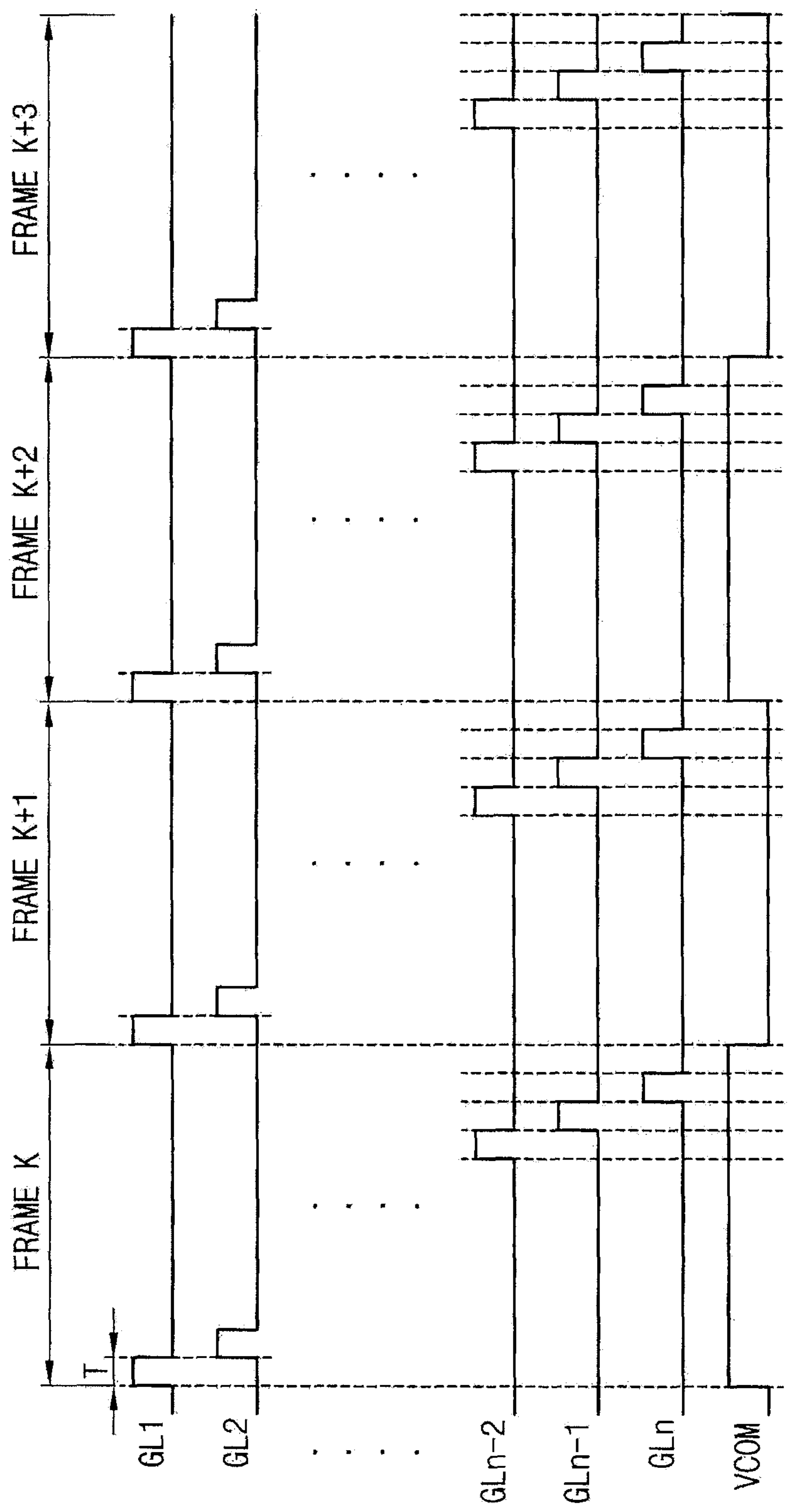
FIG. 6 is a timing diagram illustrating a conventional method of driving a display panel having an upper substrate of FIG. 5 based on a frame inversion technique.
Figure 7A:
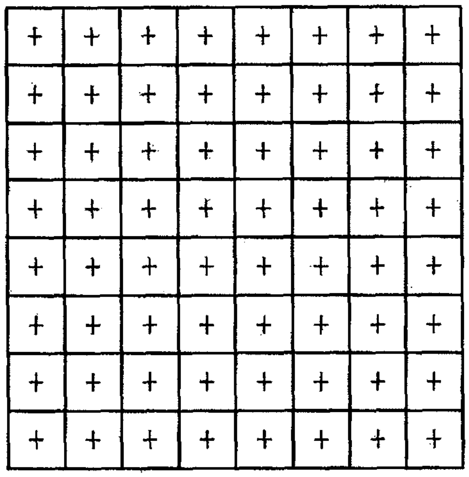
Figure 7B:
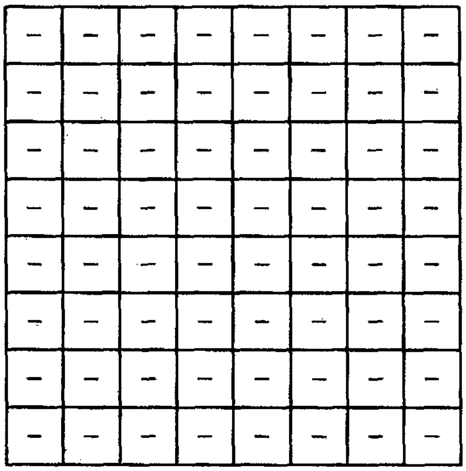

FIG. 6 is a timing diagram illustrating a conventional method of driving a display panel having an upper substrate as shown in FIG. 5 based on a frame inversion technique. FIGS. 7A, 7B, 7C, and 7D are diagrams illustrating a polarity of a common voltage that is changed by a method of FIG. 6.

Referring to FIG. 6, the gate signal may be sequentially applied to the gate lines GL1 through GLn based on a reference period T during each frame. Here, a polarity of the common voltage VCOM may be periodically inverted in synchronization with a frame period. Namely, a frame period may be the same as (e.g., have the same length as) a polarity inversion period of the common voltage VCOM. Further, a polarity of the common voltage VCOM may be inverted at the same time during each frame. For example, a polarity of the common voltage VCOM may be inverted when the gate signal is applied into a first gate line GL1 during each frame (i.e., at a start time point of each frame).

In the embodiment shown in FIG. 6, a polarity of the common voltage VCOM is positive during the (k)th frame and the (k+2)th frame. In addition, a polarity of the common voltage VCOM is negative during the (k+1)th frame and the (k+3)th frame. As described in FIGS. 7A, 7B, 7C, and 7D, the display panel 100 may operate based on a frame inversion technique because a polarity of the common voltage VCOM that is applied into all pixels P is positive during the (k)th frame and the (k+2)th frame, and a polarity of the common voltage VCOM that is applied into all pixels P is negative during the (k+1)th frame and the (k+3)th frame.

Typically, the display panel 100 may have a parasitic capacitance that is formed between each gate line GL and the drain electrode 115 of the switching element Q. In addition, the display panel 100 may have a parasitic capacitance that is formed between each data line DL and the drain electrode 115 of the switching element Q. In the display panel 100, a charged voltage of the liquid crystal capacitor CLC is maintained after the liquid crystal capacitor CLC is charged in a current frame until the liquid crystal capacitor CLC is recharged in a next frame. However, the charged voltage of the liquid crystal capacitor CLC may be decreased due to a coupling effect of the parasitic capacitances after a polarity of the common voltage VCOM is inverted. As a result, the brightness of the display panel 100 may be decreased as the charged voltage of the liquid crystal capacitor CLC is decreased.

In a driving method in which the display panel 100 performs a polarity inversion operation based on the method of FIG. 6, an average elapsed time in which the liquid crystal capacitor CLC is recharged by applying the gate signal into each gate line GL after a polarity of the common voltage VCOM is inverted may be different with respect to each of the gate lines GL1 through GLn. That is, an average lapsed time with respect to gate lines arranged in an upper region of the display panel 100 may be relatively short, and an average elapsed time with respect to gate lines arranged in a lower region of the display panel 100 may be relatively long. For example, an average lapsed time with respect to the first gate line GL1 may be the shortest, and an average lapsed time with respect to the (n)th gate line GLn may be the longest. Thus, an effective voltage of the liquid crystal capacitor CLC in a lower region of the display panel 100 may be smaller than an effective voltage of the liquid crystal capacitor CLC in an upper region of the display panel 100. Hence, in the display panel 100, the brightness of the lower region may be lower than the brightness of the upper region.

Figure 8:
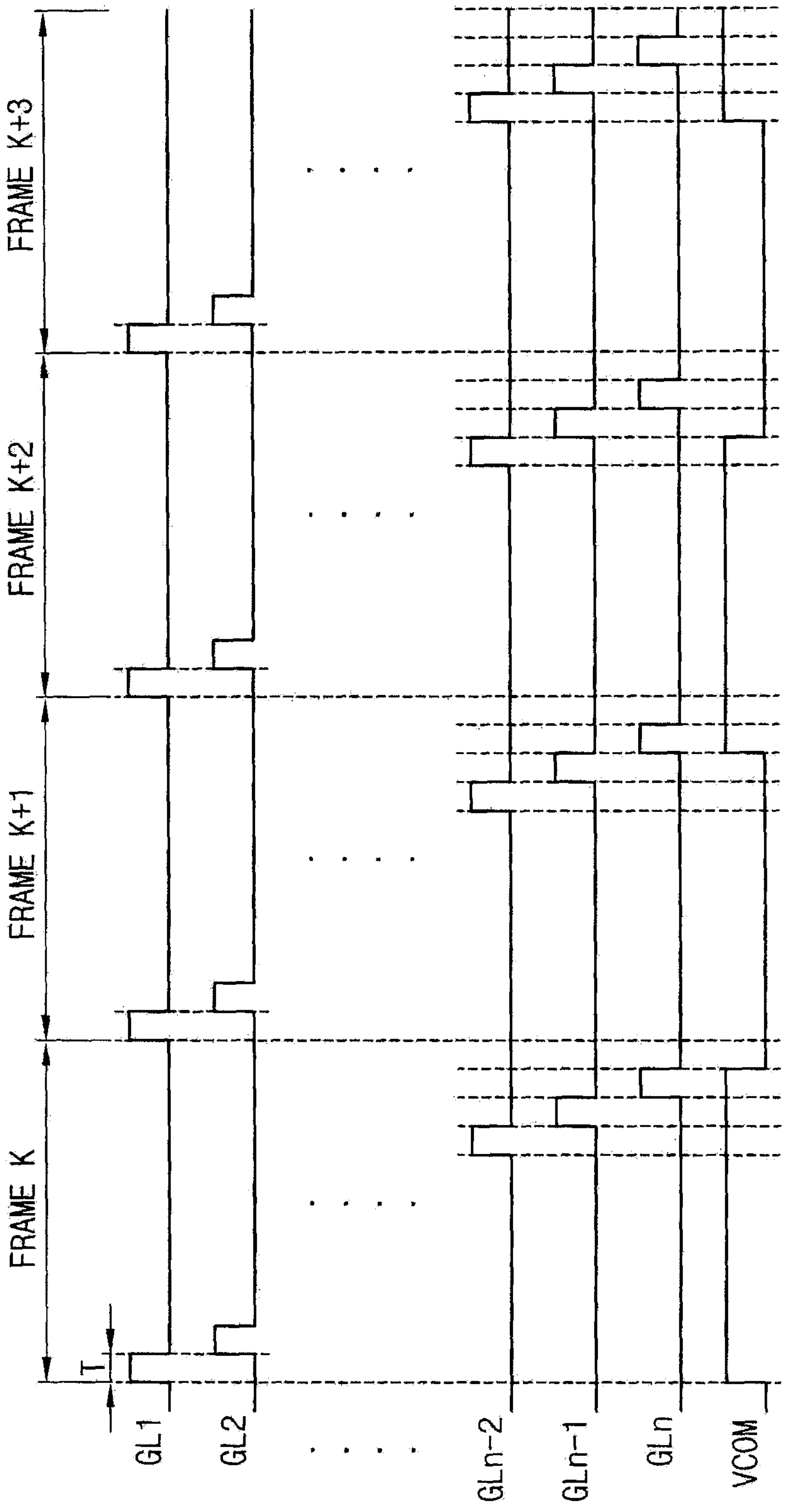
FIG. 8 is a timing diagram illustrating a method of driving a display panel having an upper substrate of the embodiment shown in FIG. 5 based on a frame inversion technique in accordance with example embodiments.
Figure 9C:
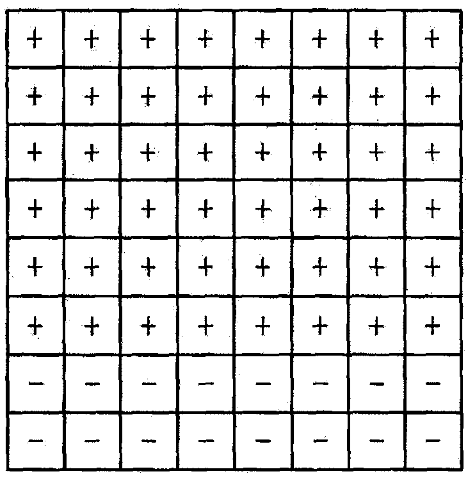
Figure 9D:
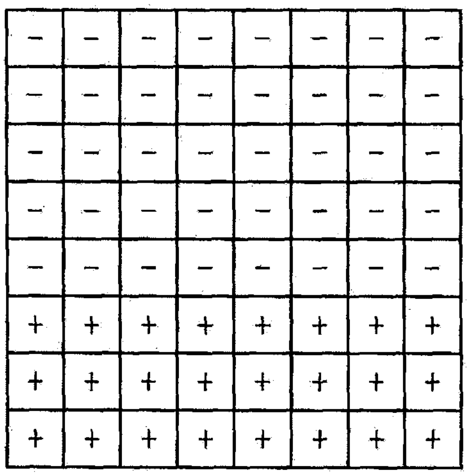

FIG. 8 is a timing diagram illustrating a method of driving a display panel having an upper substrate of FIG. 5 based on a frame inversion technique in accordance with one embodiment of the present invention. FIGS. 9A, 9B, 9C, and 9D are diagrams illustrating a polarity of a common voltage that is changed by a method of the embodiment illustrated in FIG. 8.

Referring to FIG. 8, the gate signal may be sequentially applied into the gate lines GL1 through GLn based on the reference period T during each frame. Here, a polarity of the common voltage VCOM may be periodically inverted asynchronously with respect to a frame period.

As illustrated in FIG. 8, a polarity inversion period of the common voltage VCOM is smaller than (e.g., shorter than) a frame period by the reference period T. Namely, a polarity inversion period (or the length of the polarity inversion period) of the common voltage VCOM is different from a frame period, and a polarity inversion timing of the common voltage VCOM during a frame may be different from a polarity inversion timing of the common voltage VCOM during an adjacent frame. In other words, a gate line that the gate signal is applied into when a polarity of the common voltage VCOM is inverted during a frame may be different from a gate line that the gate signal is applied into when a polarity of the common voltage VCOM is inverted during an adjacent frame. In addition, each gate line that the gate signal is applied into when a polarity of the common voltage VCOM is inverted during each of current n frames may be substantially the same as each gate line that the gate signal is applied into when a polarity of the common voltage VCOM is inverted during each of next n frames. Hence, an average elapsed time in which the liquid crystal capacitor CLC is recharged by applying the gate signal into each gate line after a polarity of the common voltage VCOM is inverted may be substantially equal with respect to each of the gate lines GL1 through GLn. As a result, brightness differences between an upper region and a lower region of the display panel 100 may be reduced or prevented.

As illustrated in FIG. 8, a polarity inversion period of the common voltage VCOM may be smaller than a frame period by the reference period T. Thus, in case that the display panel 100 performs a polarity inversion operation based on the method of FIG. 8 as illustrated in FIGS. 9A, 9B, 9C, and 9D, the display panel 100 may substantially perform a line inversion operation in asynchronously with respect to a frame period (i.e., by one gate line).

In the embodiment shown in FIG. 8, a polarity inversion period of the common voltage VCOM is smaller (e.g., shorter) than a frame period by the reference period T. However, embodiments of the present invention are not limited thereto. According to some embodiments of the present invention, a polarity inversion period of the common voltage VCOM may be greater than a frame period by the reference period T. Here, if a polarity inversion period of the common voltage VCOM is smaller than half of a frame period, power consumption may be increased. On the other hand, if a polarity inversion period of the common voltage VCOM is greater than 1.5 multiple (e.g. 1.5 times the length) of a frame period, it is difficult to reduce or prevent deterioration of the liquid crystal layer. Therefore, a polarity inversion period of the common voltage VCOM may be greater than half of a frame period, and may be smaller than a frame period by an integer multiple of the reference period T. Alternatively, a polarity inversion period of the common voltage VCOM may be greater than a frame period by an integer multiple of the reference period T, and may be smaller than 1.5 multiple (e.g., 1.5 times the length) of a frame period. Furthermore, a frame period may be determined based on the vertical synchronization signal that the controller 210 receives from outside. In this case, a polarity inversion period of the common voltage VCOM may be greater than half of a period (e.g., the length of the period) of the vertical synchronization signal, and may be smaller than a period (e.g., the length of the period) of the vertical synchronization signal by integer multiple of the reference period T. Alternatively, a polarity inversion period of the common voltage VCOM may be greater than a period of the vertical synchronization signal by integer multiple of the reference period T, and may be smaller than 1.5 multiple (e.g., 1.5 times the length) of a period of the vertical synchronization signal.

Figure 10:
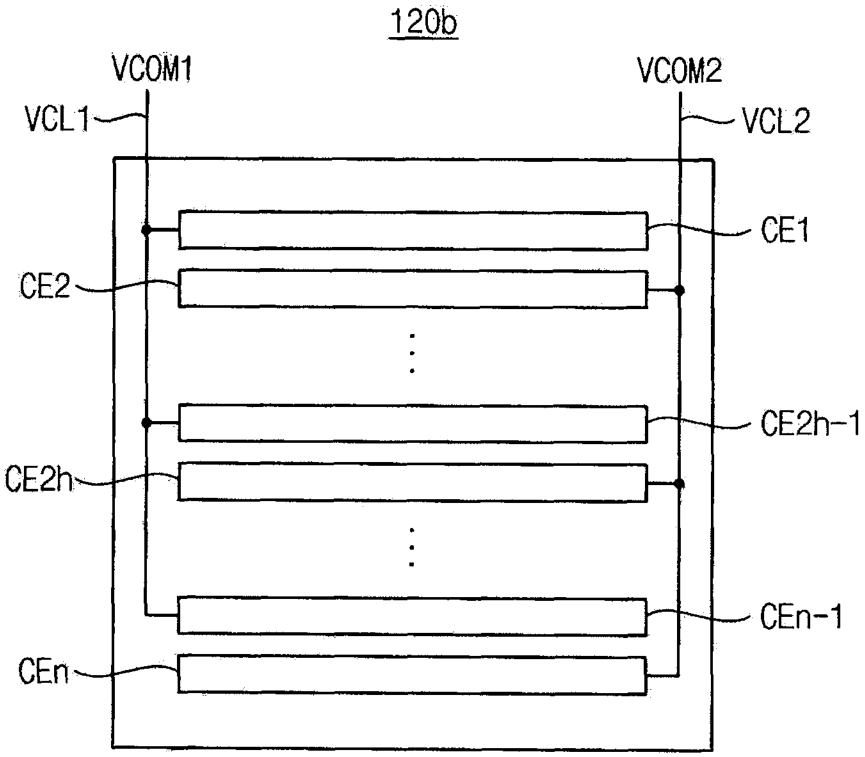
FIG. 10 is a diagram illustrating an upper substrate of a display panel in a display device of FIG. 1.

FIG. 10 is a diagram illustrating another example of an upper substrate of a display panel in a display device of FIG. 1.

Referring to FIG. 10, the upper substrate 120B includes a first common voltage line VCL1, a second common voltage line VCL2, and a plurality of common electrodes CE1 through CEn. The common electrodes CE1 through CEn may be opposite to the pixel electrodes PE that are formed on the lower substrate 110. Here, first common electrodes may be coupled to the first common voltage line VCL1, and second common electrodes may be coupled to the second common voltage line VCL2. As shown in FIG. 10, first common electrodes and the second common electrodes are alternately arranged on the upper substrate 120B. For example, the first common electrodes may be odd common electrodes, and the second common electrodes may be even common electrodes. Alternatively, the first common electrodes may be even common electrodes, and the second common electrodes may be odd common electrodes. In the embodiment shown in FIG. 10, it is illustrated that the first common electrodes are odd common electrodes, and that the second common electrodes are even common electrodes. Here, h denotes a positive integer. The first common electrodes may be opposite to the pixel electrodes PE that are coupled to the first gate lines. The second common electrodes may be opposite to the pixel electrodes PE that are coupled to the second gate lines. The first gate lines may be odd gate lines, and the second gate lines may be even gate lines. Alternatively, the first gate lines may be even gate lines, and the second gate lines may be odd gate lines.

The voltage generator 220 may generate the first common voltage VCOM1 and the second common voltage VCOM2. Here, a polarity inversion period of the first common voltage VCOM1 may be the same as a polarity inversion period of the second common voltage VCOM2. In addition, a polarity of the first common voltage VCOM1 may be opposite to a polarity of the second common voltage VCOM2. In one embodiment, a polarity of the first common voltage VCOM1 and a polarity of the second common voltage VCOM2 may be periodically inverted with an interval of the reference period T. In another example embodiment, a polarity of the first common voltage VCOM1 and a polarity of the second common voltage VCOM2 may be periodically inverted at the same time. The first common voltage VCOM1 may be applied into the first common voltage line VCL1, and the second common voltage VCOM2 may be applied into the second common voltage line VCL2. Hence, for example, the first common voltage VCOM1 may be applied into the pixels P that are coupled to the odd gate lines, and the second common voltage VCOM2 may be applied into the pixels P that are coupled to the even gate lines. Alternatively, the first common voltage VCOM1 may be applied into the pixels P that are coupled to the even gate lines, and the second common voltage VCOM2 may be applied into the pixels P that are coupled to the odd gate lines. When the display panel 100 includes the upper substrate 120B as illustrated in FIG. 10, the display panel 100 may employ a line inversion technique.

Figure 11:
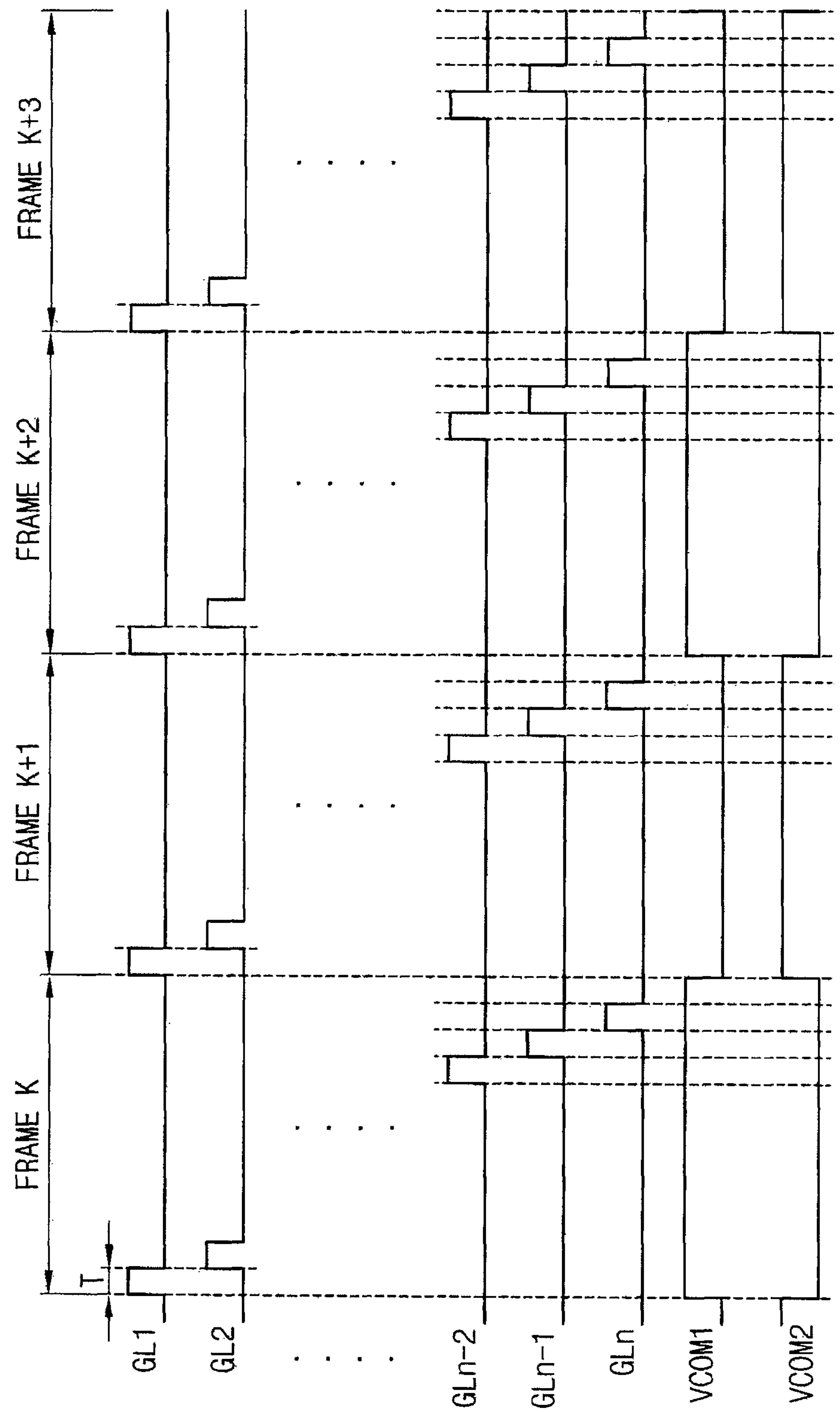
FIG. 11 is a timing diagram illustrating a conventional method of driving a display panel having an upper substrate of FIG. 10 based on a line inversion technique.
Figure 12A:
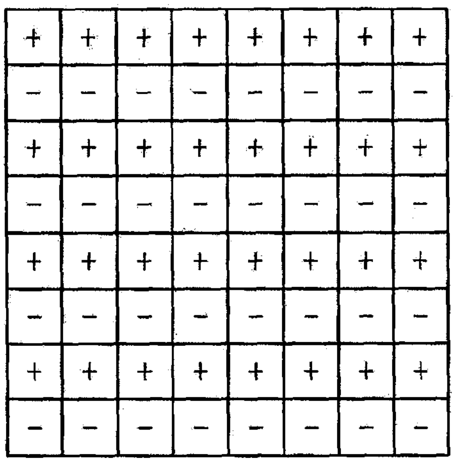
Figure 12B:
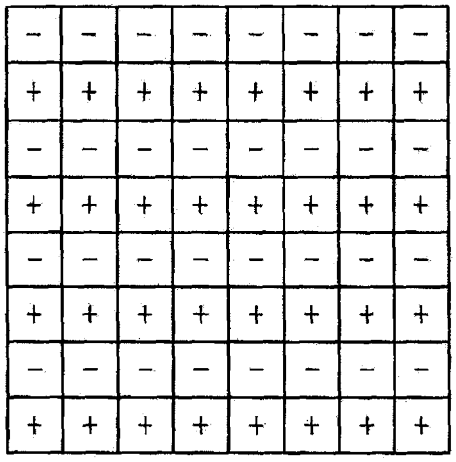

FIG. 11 is a timing diagram illustrating a conventional method of driving a display panel having an upper substrate of FIG. 10 based on a line inversion technique. FIGS. 12A, 12B, 12C, and 12D are diagrams illustrating a polarity of a common voltage that is changed by a method of FIG. 11.

Referring to FIG. 11, the gate signal may be sequentially applied into the gate lines GL1 through GLn based on the reference period T during each frame. Here, a polarity of the first common voltage VCOM1 and a polarity of the second common voltage VCOM2 may be periodically inverted in synchronization with a frame period. Namely, a frame period may be the same as a polarity inversion period of the first common voltage VCOM1 and a polarity inversion period of the second common voltage VCOM2. Further, a polarity of the first common voltage VCOM1 may be inverted at substantially the same time during each frame, and a polarity of the second common voltage VCOM2 may be inverted at substantially the same time during each frame. For example, a polarity of the first common voltage VCOM1 and a polarity of the second common voltage VCOM2 may be inverted when a gate signal is applied into a first gate line GL1 during each frame.

As illustrated in FIG. 11, a polarity of the first common voltage VCOM1 may be positive during the (k)th frame and the (k+2)th frame. In addition, a polarity of the first common voltage VCOM1 may be negative during the (k+1)th frame and the (k+3)th frame. On the other hand, a polarity of the second common voltage VCOM2 may be negative during the (k)th frame and the (k+2)th frame. In addition, a polarity of the second common voltage VCOM2 may be positive during the (k+1)th frame and the (k+3)th frame. As described above, the first common voltage VCOM1 may be applied into the pixels P that are coupled to the odd gate lines, and the second common voltage VCOM2 may be applied into the pixels P that are coupled to the even gate lines. Alternatively, the first common voltage VCOM1 may be applied into the pixels P that are coupled to the even gate lines, and the second common voltage VCOM2 may be applied into the pixels P that are coupled to the odd gate lines. As described in FIGS. 12A, 12B, 12C, and 12D, the display panel 100 may perform a line inversion operation.

In a driving method in which the display panel 100 performs a polarity inversion operation based on the method shown in FIG. 11, an average elapsed time in which the liquid crystal capacitor CLC is recharged by applying the gate signal into each gate line GL after a polarity of the first common voltage VCOM1 and a polarity of the second common voltage VCOM2 are inverted may be different with respect to each of the gate lines GL1 through GLn. That is, an average lapsed time with respect to gate lines arranged in an upper region of the display panel 100 may be relatively short, and an average elapsed time with respect to gate lines arranged in a lower region of the display panel 100 may be relatively long. For example, an average lapsed time with respect to the first gate line GL1 may be the shortest, and an average lapsed time with respect to the (n)th gate line GLn may be the longest. Thus, an effective voltage of the liquid crystal capacitor CLC in a lower region of the display panel 100 may be smaller than an effective voltage of the liquid crystal capacitor CLC in an upper region of the display panel 100. Hence, in the display panel 100, the brightness of the lower region may be lower than the brightness of the upper region.

Figure 13:
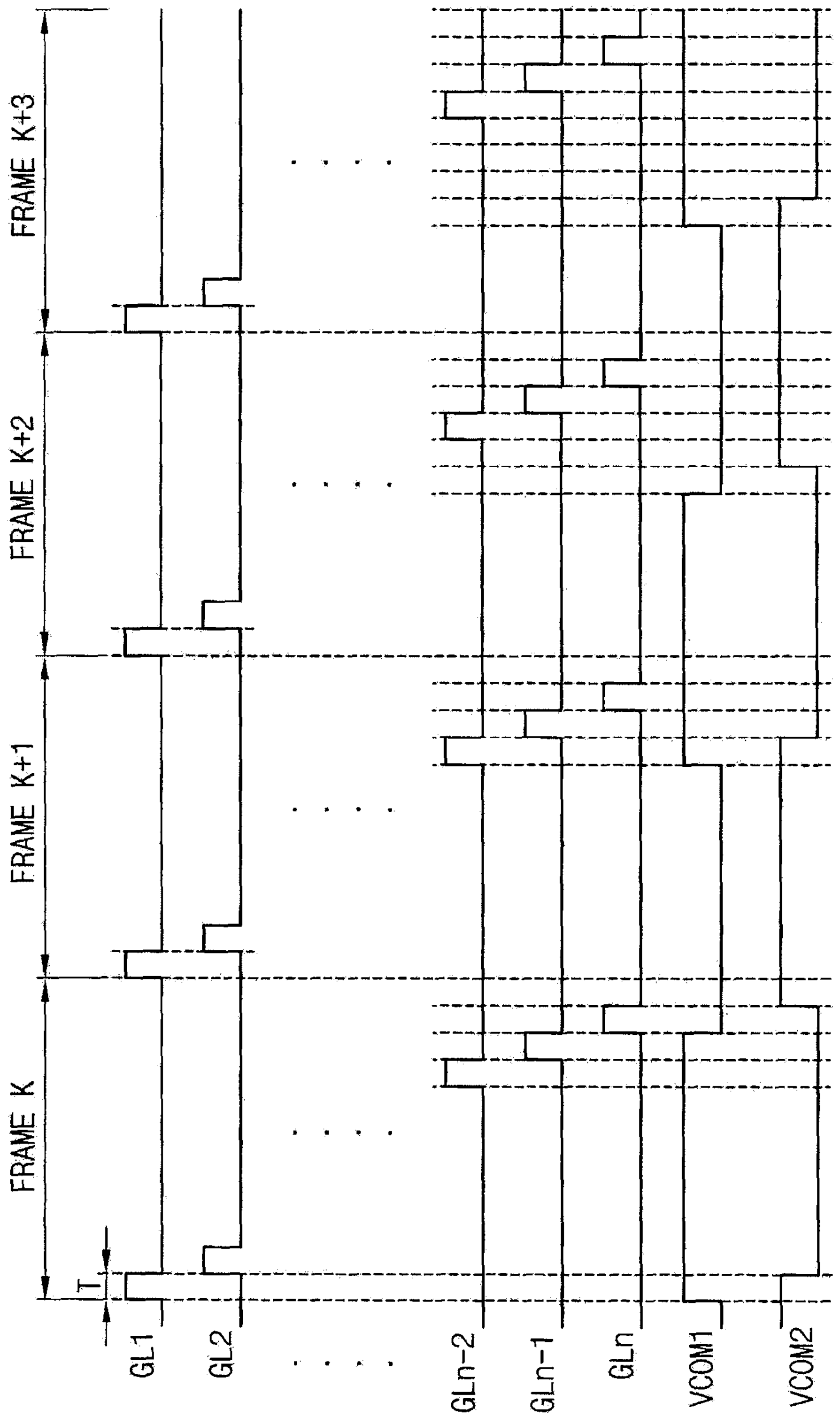
FIG. 13 is a timing diagram illustrating a method of driving a display panel having an upper substrate of FIG. 10 based on a line inversion technique in accordance with another embodiment of the present invention.

FIG. 13 is a timing diagram illustrating a method of driving a display panel having an upper substrate of FIG. 10 based on a line inversion technique in accordance with embodiments of the present invention. FIGS. 14A, 14B, 14C, and 14D are diagrams illustrating a polarity of a common voltage that is changed by a method of FIG. 13.

As described in reference to FIG. 10, the first common voltage VCOM1 may be applied into the pixels P that are coupled to the odd gate lines, and the second common voltage VCOM2 may be applied into the pixels P that are coupled to the even gate lines. Alternatively, the first common voltage VCOM1 may be applied into the pixels P that are coupled to the even gate lines, and the second common voltage VCOM2 may be applied into the pixels P that are coupled to the odd gate lines.

Referring to FIG. 13, the gate signal may be sequentially applied into the gate lines GL1 through GLn based on the reference period T during each frame. Here, a polarity of the first common voltage VCOM1 and a polarity of the second common voltage VCOM2 may be periodically inverted asynchronously with respect to a frame period. In addition, a polarity inversion period of the first common voltage VCOM1 may be the same as a polarity inversion period of the second common voltage VCOM2. In addition, a polarity of the first common voltage VCOM1 may be opposite to a polarity of the second common voltage VCOM2. In one embodiment, a polarity of the first common voltage VCOM1 and a polarity of the second common voltage VCOM2 may be inverted at different times separated by an interval of the reference period T. In another embodiment, a polarity of the first common voltage VCOM1 and a polarity of the second common voltage VCOM2 may be periodically inverted at the same time.

As illustrated in FIG. 13, a polarity inversion period of the first common voltage VCOM1 and a polarity inversion period of the second common voltage VCOM2 may be smaller than a frame period by twice the length of the reference period T. Namely, a polarity inversion period of the first common voltage VCOM1 and a polarity inversion period of the second common voltage VCOM2 may be different from (e.g., different in length and timing from) a frame period. In addition, a polarity inversion timing of the first common voltage VCOM1 in a frame may be different from a polarity inversion timing of the first common voltage VCOM1 in an adjacent frame. Similarly, a polarity inversion timing (e.g., polarity inversion time) of the second common voltage VCOM2 in a frame may be different from a polarity inversion timing (e.g., polarity inversion time) of the second common voltage VCOM2 in an adjacent frame. In other words, a gate line that the gate signal is applied into when a polarity of the first common voltage VCOM1 is inverted during a frame may be different from a gate line that the gate signal is applied into when a polarity of the first common voltage VCOM1 is inverted during an adjacent frame. In addition, a gate line that the gate signal is applied into when a polarity of the second common voltage VCOM2 is inverted during a frame may be different from a gate line that the gate signal is applied into when a polarity of the second common voltage VCOM2 is inverted during an adjacent frame. Assuming that the number of gate lines is 2S (here, S is a positive integer), each gate line that the gate signal is applied into when a polarity of the first common voltage VCOM1 is inverted during each of current S frames may be substantially the same as each gate line that the gate signal is applied into when a polarity of the first common voltage VCOM1 is inverted during each of next S frames. Similarly, each gate line that the gate signal is applied into when a polarity of the second common voltage VCOM2 is inverted during each of current S frames may be substantially the same as each gate line that the gate signal is applied into when a polarity of the second common voltage VCOM2 is inverted during each of next S frames. Hence, an average elapsed time in which the liquid crystal capacitor CLC is recharged by applying the gate signal into each gate line after a polarity of the first common voltage VCOM1 and a polarity of the second common voltage VCOM2 are inverted may be substantially equal with respect to each of the gate lines GL1 through GLn. As a result, brightness differences between an upper region and a lower region of the display panel 100 may be reduced or prevented.

As illustrated in FIG. 13, a polarity inversion period of the first common voltage VCOM1 and a polarity inversion period of the second common voltage VCOM2 are smaller (e.g., shorter) than a frame period by twice of the reference period T. Thus, in embodiments in which the display panel 100 performs a polarity inversion operation based on the method of the embodiment illustrated in FIGS. 13, 14A, 14B, 14C, and 14D, the display panel 100 may substantially perform a line inversion operation asynchronously with respect to a frame period (i.e., by two gate lines).

In FIG. 13, it is illustrated that a polarity inversion period of the first common voltage VCOM1 and a polarity inversion period of the second common voltage VCOM2 are smaller than a frame period by twice of (e.g., twice the length of) the reference period T. However, embodiments of the present invention are not limited thereto. According to some embodiments, a polarity inversion period of the first common voltage VCOM1 and a polarity inversion period of the second common voltage VCOM2 may be greater than a frame period (e.g., the length of the frame period) by twice of (e.g., twice the length of) the reference period T. In addition, if a polarity inversion period of the first common voltage VCOM1 and a polarity inversion period of the second common voltage VCOM2 are smaller than half of a frame period, power consumption may be increased. On the other hand, if a polarity inversion period of the first common voltage VCOM1 and a polarity inversion period of the second common voltage VCOM2 are greater than 1.5 multiple of a frame period, it is difficult to reduce or prevent deterioration of the liquid crystal layer. Therefore, a polarity inversion period of the first common voltage VCOM1 and a polarity inversion period of the second common voltage VCOM2 may be greater than half of a frame period, and may be smaller than a frame period by an integer multiple of (e.g., a multiple of the length of) the reference period T. Alternatively, a polarity inversion period of the first common voltage VCOM1 and a polarity inversion period of the second common voltage VCOM2 may be greater than a frame period by integer multiple of (e.g., a multiple of) the reference period T, and may be smaller than 1.5 multiple of (e.g., 1.5 times the length of) a frame period. Furthermore, a frame period may be determined based on the vertical synchronization signal that the controller 210 receives from outside. In this case, a polarity inversion period of the first common voltage VCOM1 and a polarity inversion period of the second common voltage VCOM2 may be greater than half of a period of the vertical synchronization signal, and may be smaller than a period of the vertical synchronization signal by an integer multiple of (e.g., a multiple of the length of) the reference period T. Alternatively, a polarity inversion period of the first common voltage VCOM1 and a polarity inversion period of the second common voltage VCOM2 may be greater than a period of the vertical synchronization signal by an integer multiple of (e.g., a multiple of the length of) the reference period T, and may be smaller than 1.5 multiple of a period of the vertical synchronization signal.

Figure 15:
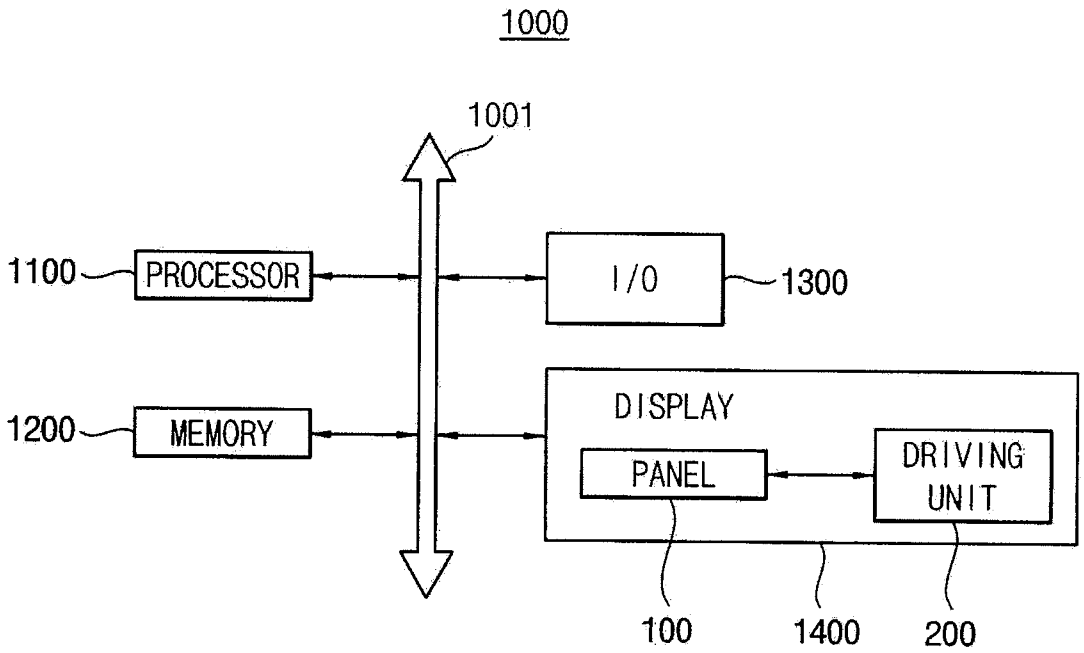
FIG. 15 is a block diagram illustrating an electric device having a display device of the embodiment of FIG. 1.

FIG. 15 is a block diagram illustrating an electric device having a display device of FIG. 1.

Referring to FIG. 15, according to one embodiment of the present invention, the electrical device 1000 includes a processor 1100, a memory device 1200, an input/output (I/O) device 1300, and a display device 1400.

The processor 1100 may perform specific calculations, or computing functions for various tasks. For example, the processor 1100 may correspond to a microprocessor, a central processing unit (CPU), etc. The processor 1100 may be coupled to the memory device 1200 via a bus 1001. For example, the memory device 1200 may include at least one volatile memory device such as a dynamic random access memory (DRAM) device, a static random access memory (SRAM) device, etc. and/or at least one non-volatile memory device such as an erasable programmable read-only memory (EPROM) device, an electrically erasable programmable read-only memory (EEPROM) device, a flash memory device, etc. The memory device 1200 may store software performed by the processor 1100. The I/O device 1300 may be coupled to the bus 1001. The I/O device 1300 may include at least one input device (e.g., a keyboard, keypad, a mouse, etc.), and/or at least one output device (e.g., a printer, a speaker, etc.). The processor 1100 may control operations of the I/O device 1300.

The display device 1400 may be coupled to the processor 1100 via the bus 1001. As described above, the display device 1400 may include the display panel 100 and the driving unit 200. The display panel 100 may include the pixels P that are coupled to the gate lines GL1 through GLn and the data lines DL1 through DLm. The driving unit 200 may drive the display panel 100. During each frame, the driving unit 200 may sequentially apply the gate signal into the gate lines GL1 through GLn, to apply the data voltages into the data lines DL1 through DLm, and to apply the common voltage VCOM into the pixels P. Here, a polarity of the common voltage VCOM may be periodically inverted asynchronously with respect to a frame period. Thus, because polarity inversion timings of the common voltage VCOM are substantially uniformly distributed through one frame period, brightness differences between the upper region and the lower region of the display panel 100 may be reduced or prevented. According to some example embodiments, the display panel 100 may perform a frame inversion operation or a line inversion operation.

The electric device 1000 may correspond to a digital television, a cellular phone, a smart phone, a personal digital assistant (PDA), a portable multimedia player (PMP), a MP3 player, a laptop computer, a desktop computer, a digital camera, etc.

Embodiments of the present invention may be used to reduce or prevent brightness differences between an upper region and a lower region of a display panel when a polarity inversion technique (e.g., a frame inversion technique, a line inversion technique, etc.) is employed. In particular, the present invention may be efficiently applied into an electric device for providing a high quality image (e.g., a digital television, a cellular phone, etc.).

The foregoing is illustrative of example embodiments of the present invention and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims and equivalents thereof.

What is claimed is:

1. A method of driving a display panel, comprising:

sequentially applying a gate signal to a plurality of gate lines of the display panel during each frame period of a plurality of frame periods;

applying data voltages to a plurality of data lines of the display panel; and applying a common voltage to the display panel, a polarity of the common voltage having a plurality of polarity inversion periods and being inverted periodically and asynchronously with a frame period of the frame periods, wherein each of the plurality of polarity inversion periods has a same length.

2. The method of claim 1, wherein a gate line of the gate lines to which the gate signal is applied when the polarity of the common voltage is inverted during a frame period of the frame periods is different from a gate line of the gate lines to which the gate signal is applied when the polarity of the common voltage is inverted during an adjacent frame.

3. The method of claim 2, wherein each gate line to which the gate signal is applied when the polarity of the common voltage is inverted during each of R frames is the same as each gate line to which the gate signal is applied when the polarity of the common voltage is inverted during corresponding ones of each of next R frames.

4. The method of claim 2, wherein an average elapsed time in which the gate signal is applied to each gate line after the polarity of the common voltage is inverted is substantially equal with respect to each of the gate lines.

5. The method of claim 1, wherein the length of each of the plurality of polarity inversion periods of the common voltage is smaller than a length of the frame period, and is greater than half of the length of the frame period.

6. The method of claim 1, wherein the length of each of the plurality of polarity inversion periods of the common voltage is smaller than 1.5 times a length of the frame period, and is greater than a length of the frame period.

7. The method of claim 1, wherein the length of each of the plurality of polarity inversion periods of the common voltage is smaller than a length of a period of a vertical synchronization signal, and is greater than half of the length of the period of the vertical synchronization signal, the frame period corresponding to the vertical synchronization signal.

8. The method of claim 1, wherein the length of each of the plurality of polarity inversion periods of the common voltage is smaller than 1.5 multiple of a length of a period of a vertical synchronization signal, and is greater than the length of the period of the vertical synchronization signal, the frame period corresponding to the vertical synchronization signal.

9. The method of claim 1, wherein the common voltage is applied to all pixels of the display panel.

10. The method of claim 9, wherein the length of each of the plurality of polarity inversion periods of the common voltage is smaller than the frame period by an integer multiple of a length of a reference period, and is greater than half of a length of the frame period, the gate signal being applied to one of the gate lines for the length of the reference period.

11. The method of claim 9, wherein the length of each of the plurality of polarity inversion periods of the common voltage is smaller than 1.5 times a length of the frame period, and is greater than the length of the frame period by an integer multiple of a length of a reference period, the gate signal being applied to one of the gate lines for the length of the reference period.

12. The method of claim 9, wherein the length of each of the plurality of polarity inversion periods of the common voltage is smaller than a length of a period of a vertical synchronization signal by an integer multiple of a length of a reference period, and is greater than half of the length of the period of the vertical synchronization signal, the gate signal being applied to one of the gate lines for the length of the reference period, and the frame period corresponding to the vertical synchronization signal.

13. The method of claim 9, wherein the length of each of the plurality of polarity inversion periods of the common voltage is smaller than 1.5 times a length of a period of a vertical synchronization signal, and is greater than the period of the vertical synchronization signal by an integer multiple of a length of a reference period, the gate signal being applied to one of the gate lines for the length of the reference period, and the frame period corresponding to the vertical synchronization signal.

14. The method of claim 1, wherein the common voltage includes a first common voltage applied to pixels coupled to first gate lines, and a second common voltage applied to pixels coupled to second gate lines, the first gate lines and the second gate lines being alternately arranged, wherein the length of each of the plurality of polarity inversion periods of the first common voltage is substantially the same as the length of each of the plurality of polarity inversion periods of the second common voltage, wherein a polarity of the first common voltage and a polarity of the second common voltage are inverted at different times separated by an interval of a reference period, the gate signal being applied based on the reference period, and wherein the polarity of the first common voltage is opposite to the polarity of the second common voltage.

15. The method of claim 14, wherein the length of each of the plurality of polarity inversion periods of the first common voltage and the length of each of the plurality of polarity inversion periods of the second common voltage are smaller than a length of the frame period by an integer multiple of the reference period, and are greater than half of the length of the frame period.

16. The method of claim 14, wherein the length of each of the plurality of polarity inversion periods of the first common voltage and the length of each of the plurality of polarity inversion periods of the second common voltage are smaller than 1.5 times a length of the frame period, and are greater than a length of the frame period by an integer multiple of the reference period.

17. The method of claim 14, wherein the length of each of the plurality of polarity inversion periods of the first common voltage and the length of each of the plurality of polarity inversion periods of the second common voltage are smaller than a length of a period of a vertical synchronization signal by an integer multiple of the reference period, and are greater than half of the length of the period of the vertical synchronization signal, the frame period corresponding to the vertical synchronization signal.

18. The method of claim 14, wherein the length of each of the plurality of polarity inversion periods of the first common voltage and the length of each of the plurality of polarity inversion periods of the second common voltage are smaller than 1.5 times the length of a period of a vertical synchronization signal, and are greater than a length of a period of a vertical synchronization signal by an integer multiple of the reference period, the frame period corresponding to the vertical synchronization signal.

19. A display device, comprising:

a display panel having a plurality of pixels coupled to a plurality of gate lines and a plurality of data lines; and a driving unit configured to sequentially apply a gate signal to the gate lines during each frame period of a plurality of frame periods, to apply data voltages to the data lines, and to apply a common voltage having a plurality of polarity inversion periods to the pixels, a polarity of the common voltage being inverted periodically and asynchronously with respect to a frame period of the frame periods, wherein each of the plurality of polarity inversion periods has a same length.

20. The display device of claim 19, wherein an average elapsed time in which the gate signal is applied to each gate line after the polarity of the common voltage is inverted is substantially equal with respect to each of the gate lines.

* * * * *